March 15, 1960     P. G. HJERTBERG     2,928,995
PROTECTIVE MEANS FOR SERIES CAPACITORS ON POWER LINES
Filed Nov. 21, 1955

INVENTOR.
Peter Gustav Hjertberg
BY
Attorney.

United States Patent Office 2,928,995
Patented Mar. 15, 1960

2,928,995

PROTECTIVE MEANS FOR SERIES CAPACITORS ON POWER LINES

Peter Gustav Hjertberg, Vasteras, Sweden, assignor to Allmanna Svenska Elektriska Aktiebolaget, Vasteras, Sweden, a corporation of Sweden Application November 21, 1955, Serial No. 547,891

Claims priority, application Sweden June 28, 1955

4 Claims. (Cl. 317—12)

This invention relates to a combined spark gap and symmetry protective means for batteries of series capacitors on electrical power lines.

A battery of series capacitors on electric power lines is usually provided with a spark gap for limiting the overvoltages arising when the line current attains abnormal values because of short-circuits or earth faults on the line. Usually it is further desired to get an indication of faults in a part of the battery of capacitors before the fault spreads, and the battery is to this end usually arranged symmetrically, so that a fault in one unit may be indicated through an indication of a beginning unsymmetry.

A protective means for a battery of capacitors of this sort comprises partly means influenced by flash-over in the spark gap, and partly means influenced by unwanted unsymmetries in the battery of series capacitors. The first mentioned means may e.g. execute a short-circuiting of the spark gap to prevent the spark gap from overloading, while the other means among other things may indicate to the attendants an arising fault in the capacitors, and may eventually even unload the battery.

A protective means of the sort indicated above hitherto has comprised two transformers being connected to separate parts of the protective system. One of those transformers has been a current transformer with a primary winding in series with the spark gap, while the other has been a current or voltage transformer connected to the battery of capacitors in such a way that a secondary current or voltage arises only when an unwanted unsymmetry occurs. An arrangement of this sort is very costly however, as both transformers have to be insulated for the total voltage between line and earth.

According to the invention, the cost of the protective means may be considerably reduced, because one of the transformers becomes superfluous, or can be substituted by a transformer insulated for only a small part of the line voltage. The invention is characterised in that a fault indication is released by a current in a secondary winding of a current transformer, the primary of which is influenced by the current through the spark gap as well as by a current corresponding to an unsymmetry in the battery of capacitors.

Figure 1:
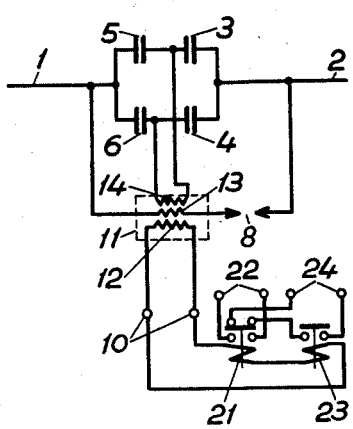
Figure 2:
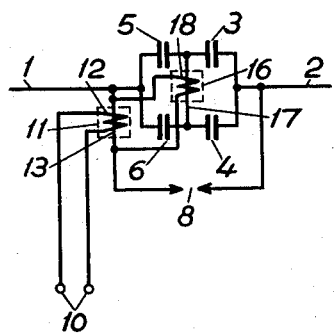
Figure 3:
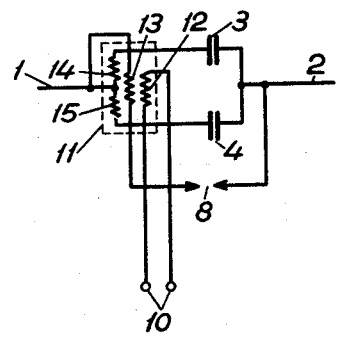

In the accompanying drawing the Figures 1, 2 and 3 show three preferred forms of the invention, which differ only in the way in which the current appearing by an unsymmetry is influencing the transformer.

In Figure 1 the numerals 1 and 2 designate two parts of a power line, which parts are connected by a battery of series capacitors. The battery is arranged in the form of a four-armed bridge with arms 3, 4, 5, 6, which each may comprise one or more capacitor units. The four bridge arms 3, 4, 5, 6 are dimensioned in such a way that the junction points for the bridge arms 3 and 5, respectively 4 and 6, have the same potential, when all the capacitor units in the battery are undamaged, and between these points is connected a primary winding 14 of a current transformer 11. A spark gap 8 is connected in series with a second primary winding 13 of the current transformer 11 in parallel to the battery of capacitors.

A secondary winding 12 of the current transformer 11 is connected to two current sensitive relays 21 and 23 at the terminals 10. The relay 23 is arranged to have a low current limit and is provided with a making contact, which in series with a breaking contact on the relay 21 is connected to terminals 24. The relay 21 is arranged to have a higher current limit than the relay 23, and is provided with a breaking contact and a making contact, the last mentioned of which is connected to terminals 22.

The current transformer 11 is, as shown in Figure 1, excited by the current through the spark gap 8 as well as by the current appearing by an unsymmetry in the battery of capacitors. By flash-over in the spark gap 8 the primary winding 13 carries a very high current, and the relays 21 and 23 are so chosen that both of them trip at a secondary current corresponding to this primary current in the transformer 11. By flash-over in the spark gap 8 the terminals 22 are thus short-circuited by the making contact of relay 21. The terminals 24 remain open, because the breaking contact of relays 21 is open.

By a small unsymmetry in the battery of capacitors the primary winding 14 will carry a small current, and when the winding ratios of the transformer 11 is suitably chosen, the secondary current will be so small, that the relay 21 remains in the unexcited position, while the relay 23 trips by a prescribed limit for the unsymmetry. In this case the terminals 24 are short-circuited, while the terminals 22 remain open.

In spite of the fact that the arrangement in Figure 1 only comprises one transformer as connection between the relay part of the protective means and the battery of capacitors, the protective means is capable of distinguishing faults in the battery of capacitors from flash-over in the spark gap. The most expensive part of the transformer 11 is the insulation between the secondary winding 12 and the primary windings 13 and 14, because this insulation must withstand the total line voltage, which may be several hundred kilovolts. The insulation between the two primary windings 13 and 14 needs however only to withstand the voltage over the capacitors 5 and 6, which usually is only a few kilovolts.

Even if the voltage between the two primary windings 13 and 14 is low, it may prohibit the use of standard current transformers. A normal current transformer may however be used, if the arrangement is modified according to Figure 2. This protective means corresponds in every respect to the protective system shown in Figure 1, and the relays 21 and 23, or equivalent arrangements, may be connected to the terminals 10, as shown in Figure 1.

In Figure 2 the current transformer 11 is provided with only one primary winding 13, insulated from the secondary winding 12 for the total line voltage. This primary winding 13 is connected in series with the spark gap 8 as in Figure 1, but is further connected to a secondary winding 18 of a second current transformer 16. A primary winding 17 of said second current transformer 16 is connected to the bridge connected parts 3, 4, 5, 6 of the battery of capacitors in the same way as in Figure 1.

The primary of the current transformer 11 is in this arrangement influenced by the current through the spark gap 8 as well as by the current in the bridge diagonal of the battery of capacitors, as in Figure 1. The transformer 16 has for its purpose only to introduce the necessary insulation between the two currents, and the winding ratio of this transformer should correspond to the winding ratio between the two primary windings 13 and 14 in Figure 1. Because of the relatively low voltage between the windings of the transformer 16, this transformer is very much cheaper than a current transformer for the total line voltage.

In Figure 3 is shown a third form of the invention, in which a normal three-range current transformer may be used without extra insulation between the different parts of the primary winding. A primary winding 13 on the current transformer 11 is connected in series with the spark gap 8, as in the above described arrangements, but the battery of capacitors is arranged only in two parts 3 and 4. Two primary windings 14 and 15 are connected in series with each one of the parts 3 and 4 of the battery of capacitors, and are arranged in such a way, that their total ampereturns are zero, when the battery of capacitors is undamaged. This requirement is fulfilled when the product of turns in the primary winding 14 and the capacitance in the capacitors 3 equals the product of turns in 15 and capacitance in 4. If the halves 3 and 4 of the battery of capacitors are equal, the primary windings 13 and 14 should also be equal, and in this case an ordinary three-range current transformer with four equal primary windings may be used, in that the windings 14 and 15 each corresponds to one primary winding, and the winding 13 in Figure 3 is made up of the two remaining primary windings, preferably in parallel.

Between the terminals 10 a current may be taken out, as in the other forms of the invention, which current partly depends on the current through the spark gap 8, partly depends on unsymmetry in the battery of capacitors. An unwanted unsymmetry causes the ampereturns of the currents in the primary windings 14 and 15 no longer to neutralize each other, and a resulting ampereturn arises, which only can be neutralized by a current in the secondary winding 12. Because all the primary windings of the current transformer in this form of the invention are connected to a common conductor 1, no potential difference can ever arise between them, and the demand for insulation between the primary windings is thus very small.

Only one form of the relay part of the protective means is shown in the accompanying drawing, but even if the form shown is very advantageous, the invention may of course be utilized in other ways.

I claim as my invention:

1. Protective system for a battery of series capacitors shunted by a spark gap, comprising a current transformer having a secondary winding and a first and a second primary winding system, a plurality of current sensitive relay means connected to said secondary winding, said first primary winding system being operatively connected to said battery and responsive to an unwanted asymmetry in said battery of series capacitors producing primary ampereturns in said current transformer, and said second primary winding system being operatively connected to said spark gap responsive to a current through said spark gap producing primary ampereturns in said current transformer, and said first and second winding systems being at substantially the electrical potential of said battery.

2. Protective system for a battery of series capacitors shunted by a spark gap, said battery being arranged in a four-armed bridge with two free junction points, and said protective system comprising a first current transformer having one primary and one secondary winding, current sensitive relay means connected to said secondary winding, said primary winding being series-connected with said spark gap, a second current transformer having one primary and one secondary winding, said primary winding of said second current transformer being connected to said two free junction points of said four-armed bridge, and said secondary winding of said second current transformer being connected to said primary winding of said first current transformer.

3. Protective system for a battery of series capacitors shunted by a spark gap, said battery comprising two parallel halves, and said protective system comprising a current transformer having one secondary winding and three primary windings, current sensitive relay means connected to said secondary winding, one of said primary windings being series-connected with said spark gap, one of said primary windings being series-connected with each of said two halves of said battery of capacitors, and said primary winding in series connection with the spark gap being disconnected when said spark gap is extinguished.

4. Protective system for a battery of series capacitors shunted by a spark gap, comprising a current transformer having a secondary winding and a first and second primary winding system, two current sensitive relay means having different operating currents and being series-connected with said secondary winding, said first primary winding system being operatively connected to said battery and responsive to an unwanted asymmetry in said battery of series capacitors producing primary ampereturns in said current transformer, and said second primary winding system being operatively connected to said spark gas responsive to a current through said spark gap producing primary ampereturns in said current transfomer, and said first and second winding systems being at substantially the electrical potential of said battery.

References Cited in the file of this patent

UNITED STATES PATENTS

| 2,072,717 | Marbury | Mar. 2, 1937 |
| 2,125,077 | Marbury | July 26, 1938 |
| 2,246,324 | Schroder | June 17, 1941 |
| 2,550,119 | Marbury | Apr. 24, 1951 |
| 2,584,710 | Johnson | Feb. 5, 1952 |
| 2,654,058 | McIntosh | Sept. 29, 1953 |
| 2,746,003 | Wegener | May 15, 1956 |

FOREIGN PATENTS

| 127,734 | Austria | Dec. 15, 1931 |
| 902,182 | France | Aug. 21, 1945 |